Oct. 30, 1962     B. A. SHADER     3,061,021
CULTIVATOR
Filed Oct. 21, 1960
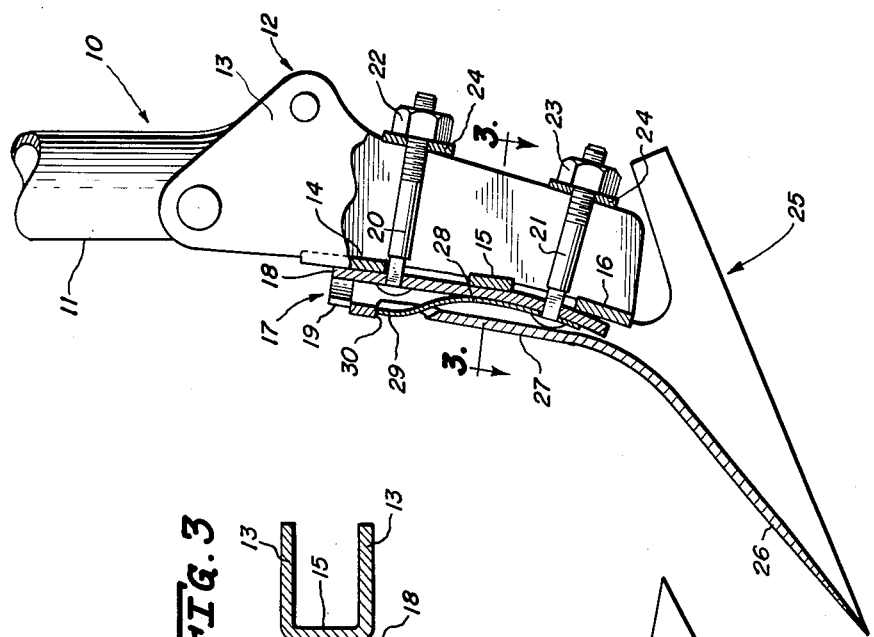
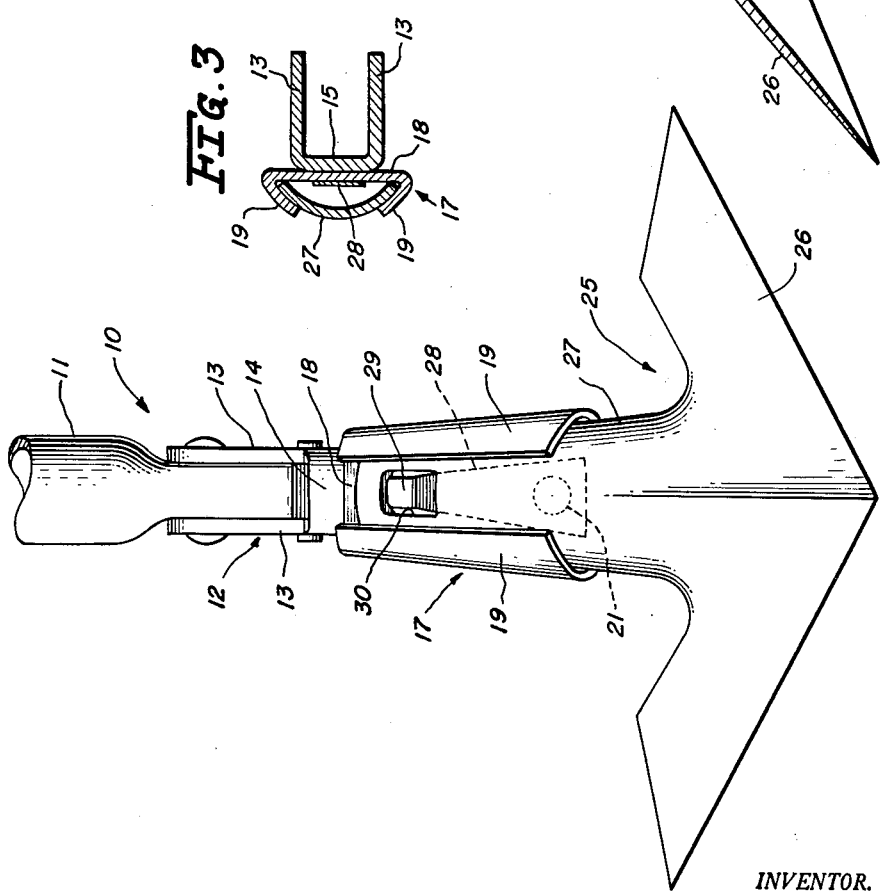
INVENTOR.
Benjamin A. Shader
Atty.

United States Patent Office 3,061,021
Patented Oct. 30, 1962

3,061,021
CULTIVATOR
Benjamin A. Shader, Hinsdale, Ill., assignor to International Harvester Company, Chicago, Ill., a corporation of New Jersey
Filed Oct. 21, 1960, Ser. No. 64,010
3 Claims. (Cl. 172—750)

This invention relates to agricultural implements and particularly to cultivators, and has for its object the provision of an improved cultivator unit by which substantial economies in the time and cost of removing, repairing and replacing the earthworking tools are effected.

Another object of the invention is the provision of a quick attachable shovel and holder unit wherein the conventional method of securing the earthworking tool to its supporting standard by bolts and nuts is avoided.

Another object of the invention is the provision of an improved cultivator assembly wherein the tool support or holder has a socket in which the shank or tang of the cultivator shovel is insertable and automatically and releasably locked in operating position.

Other objects and advantages of the invention will become clear from the following detailed description when read in conjunction with the accompanying drawings, wherein:

FIGURE 1 is a front elevation of a portion of a cultivator incorporating the features of this invention;

FIGURE 2 is a view in side elevation, partly in section, of the structure shown in FIGURE 1, and FIGURE 3 is a section taken along the line 3—3 of FIGURE 2.

The numeral 10 designates a tool support including an upper standard section 11 and a lower tool holding section 12.

Tool holder 12 is generally U-shaped and comprises side plates 13 having their forward edges connected by cross bar members 14, 15 and 16.

An elongated tapered socket member 17 extends generally vertically and comprises a flattened base 18 adapted to lie against the forward face of holder 13, and wing sections 19 which are bent outwardly and inwardly with a central spacing between the ends thereof as shown in the drawings.

Socket member 17 is removably secured to the holder 12 by a pair of bolts 20 and 21 received in openings provided in the flattened base 18 of the socket and extending through the spaces provided between cross bars 14, 15 and 16. The ends of bolts 20 and 21 are threaded to receive nuts 22 and 23, respectively, the latter being spaced from the plates 13 by washers in the form of cross bars 24.

The cultivator shovel chosen for purposes of illustration is a sweep 25 having a lower earth-penetrating section 26 and an elongated upper shank or tang section 27 tapered for sliding reception in the socket 17 and transversely curved as shown in FIGURE 3 with the side edges thereof received in the corners formed by the wings 19 with the base 18 and with the central curved portion thereof spaced from the flattened base 18 of the socket member.

To hold the shank 27 securely in the socket member 17 and prevent displacement thereof from the socket, a leaf spring 28 is provided, secured at one end to the lower end of base portion 18 of the socket by means of the fastening bolt 21. The free end 29 of the spring is bent outwardly from the base 18, and into engagement with the central portion of the transversely curved shank 27. The bent end 29 of the spring serves as a detent and is received in a recess or opening 30 in the upper center of the shank 27.

In assembling the parts, the shank 27 is inserted in the base of the socket member 17, the upper edge of the shank engaging the leaf spring 28 and depressing it until the bent end or detent section 29 of the spring is received in the recess or opening 30 in the shank, whereupon the end of the spring engages the edge of the recess and the sweep is held against axial displacement relative to the socket member. Disassembly and removal of the sweep 25 is easily and quickly accomplished by depressing the end 29 of the spring and withdrawing the sweep.

While the end of spring 28 is shown engaging an edge of the opening 30, it is well within the scope of this invention to bring the end of the spring inwardly so that the engagement between the shank 27 and the spring is entirely frictional, and a central depression provided on the inner surface of the shank instead of the free opening to receive the bent portion of the spring.

It should likewise be understood that, while the socket member 17 is illustrated as a removable attachment for a conventional breakaway coupling or holder 12, the socket member may be formed integrally with the holder.

It should further be understood that the invention has been described in its preferred embodiment only, and that modifications may be made therein without departing from the spirit of the invention or the scope of the appended claims.

What is claimed is:

1. A cultivator comprising a generally vertically extending standard having a lower tool-holding portion, an elongated tapered socket member mounted on said tool-holding portion including a flattened base and outwardly and inwardly curved wing portions, a shovel having a lower earth-penetrating section and an upper shank tapered for sliding reception in said socket member, said shank being transversely curved to provide a central spacing therebetween and the base of said socket member and to fit the curvature of said wing sections, and a leaf spring anchored at one end to the base of said socket member and operatively engageable with said shank to hold the shank in the socket member.

2. A cultivator comprising a generally vertically extending standard having a lower tool-holding portion, an elongated tapered socket member mounted on said tool-holding portion including a flattened base and outwardly and inwardly curved wing portions, a shovel having a lower earth-penetrating section and an upper shank tapered for sliding reception in said socket member, said shank being transversely curved to provide a central spacing therebetween and the base of said socket member and to fit the curvature of said wing sections, said shank having a central recess therein, and means serving as a yieldable detent secured to the base of said socket member and receivable in said recess to hold the shank against displacement from said socket member.

3. A cultivator comprising a generally vertically extending standard having a lower tool-holding portion, an elongated tapered socket member mounted on said tool-holding portion including a flattened base and outwardly and inwardly curved wing portions, a shovel having a lower earth-penetrating section and an upper shank tapered for sliding reception in said socket member, said shank being transversely curved to provide a central spacing therebetween and the base of said socket member and to fit the curvature of said wing sections, said shank having a central recess therein, and a leaf spring anchored at one end to the base of said socket member, the free end of said spring being bent upwardly for reception in said recess to hold the shank in the socket member.

References Cited in the file of this patent

UNITED STATES PATENTS

| | | |
|---|---|---|
| 267,060 | Buell | Nov. 7, 1882 |
| 1,807,998 | McCord | June 2, 1931 |

FOREIGN PATENTS

| | | |
|---|---|---|
| 3,768 of 1931 | Australia | July 28, 1932 |